C. A. BAILEY.
COUPLING.
APPLICATION FILED DEC. 16, 1918.
1,345,735.
Patented July 6, 1920.
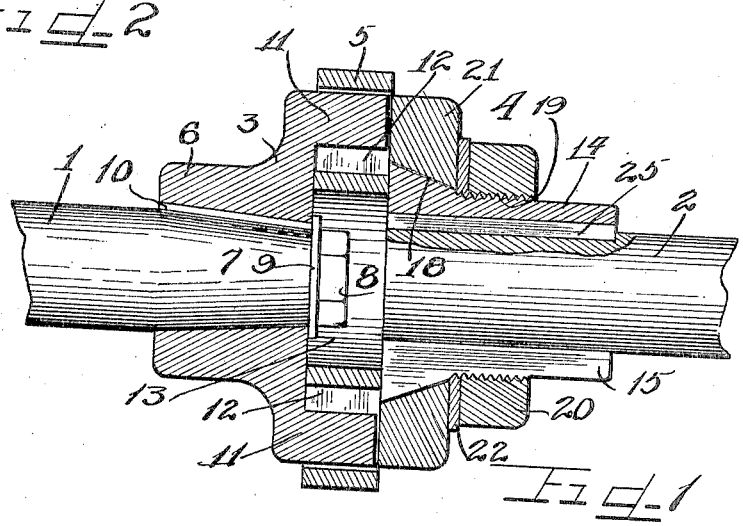
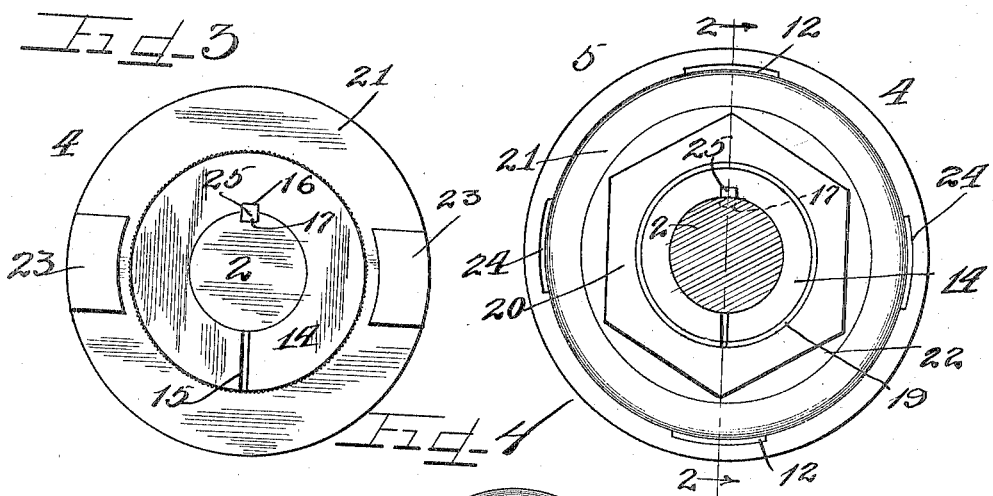
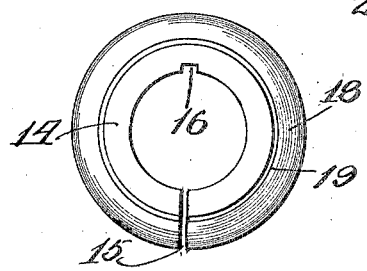

UNITED STATES PATENT OFFICE.

CHARLES A. BAILEY, OF CHICAGO, ILLINOIS.

COUPLING.

1,345,735. Specification of Letters Patent. Patented July 6, 1920.

Application filed December 16, 1918. Serial No. 266,891.

*To all whom it may concern:*

Be it known that I, CHARLES A. BAILEY, a citizen of the United States, and a resident of the city of Chicago, in the county of Cook and State of Illinois, have invented certain new and useful Improvements in Couplings; and I do hereby declare that the following is a full, clear, and exact description of the same, reference being had to the accompanying drawings, and to the numerals of reference marked thereon, which form a part of this specification.

My invention has reference more particularly to a coupling for providing an adjustable driving connection between two shafts or rotary members.

An object of my invention is to provide a power transmission coupling which is adapted to be adjusted to vary the driving connection afforded thereby.

Another object of my invention is to provide a power transmission coupling for connecting rotary members and comprising adjustable parts whereby axial and rotary adjustment may be readily made.

Another object of my invention is to provide a coupling for connecting rotary members so as to rotate together, and having a connection with one of the members whereby the coupling member may be adjusted axially and circumferentially with reference to the rotary members.

Another object of my invention is to provide a coupling adjustably connected with one of the members connected thereby, so as to permit axial and circumferential adjustment of the coupling with reference to said members and having clamping means for simultaneously locking the parts affording such adjustment.

Another object of my invention is to provide a coupling which is particularly adapted for connecting a magneto shaft with a driving shaft and having improved means for adjusting the driving connection to accurately time the operation of the magneto.

My invention also has other important objects which will appear from the following specification and the accompanying drawings.

On the drawings:

Figure 1 is an end view of the coupling with the shaft at that end in section.

Fig. 2 is an axial sectional view on the line 2—2 of Fig. 1, with the shafts shown in elevation.

Fig. 3 is an inner end view of the adjustable half section of the coupling.

Fig. 4 is an end view of the adjustable sleeve.

As shown on the drawings:

The reference numerals 1 and 2 indicate the shafts which the coupling connects, and said coupling comprises the sections 3 and 4, on the shafts 1 and 2, respectively, which sections interlock with a connecting ring 5. The section 3 has a hub 6 with a tapered opening therein, which engages the tapered end 7, of the shaft 1, and is forced and held thereon by the cap screw 8, which is threaded into the end of the shaft 1, and has the washer 9, under the head thereof engaging the inner end of the hub 6. The tapered end 7, of the shaft 1, is provided with a keyway, and the tapered opening in the hub 6 with a corresponding keyway, both of which are engaged by the key 10, so that the coupling 3 and shaft 1 rotate together.

The section 3, has a pair of diametrically arranged lugs 11, extending forwardly therefrom and engaged in diametrical openings 12, with which the connecting ring 5 is provided, said openings being elongated radially to afford relative movement between the section 3 and ring 5, which may be required if the shafts 1 and 2 are not exactly alined, and the ring 5 has the central opening 13 to accommodate the head of the cap screw 8 and the washer 9, and also to admit the inner end of the shaft 2, in case it projects beyond the inner face of the coupling member 4, which is mounted thereon.

The coupling section 4, comprises the sleeve 14, which is split at 15 to provide for expansion and contraction whereby it may be adjusted and clamped on the shaft 2, and is held from rotation on the shaft 2, by means of the key 25, which engages the keyway 16, in the sleeve 14, and a corresponding keyway 17, in the shaft 2. The sleeve 14, is tapered at the inner end, at 18, and is also externally threaded at 19 to have the clamp nut 20 screwed thereon, and there is a ring 21, having a central opening tapered to correspond to and seat against the tapered end 18, of the sleeve 14, and having the walls of the tapered opening serrated or otherwise constructed to grip the surface of the tapered section 18. A washer 22, is interposed between the ring 21 and the nut 20, and the latter, when turned on the threaded portion 19, of the sleeve 14, forces the ring 21 into engagement with the tapered portion 18, of the sleeve 14, so as to contract the sleeve and clamp same firmly on the shaft 2, and at the same time clamp the ring 21 firmly in place on the tapered portion 18, of the sleeve 14. The ring 21 has forwardly projecting lugs 23, which engage with openings 24, in the ring 5, which said openings are arranged therein a quarter turn from the openings 12, and like the openings 12, are elongated radially to permit necessary play in case the shafts 1 and 2 are not in exact alinement.

The operation is as follows:

This clutch or coupling is used to connect the adjoining ends of shafts such as a magneto shaft and its driving shaft, which, however, owing to the play afforded the lugs 11 and 23, in their respective openings 12 and 24, need not be in exact alinement. The clutch section 3 is secured on the end of the shaft 1, and the clutch section 4 is mounted on the shaft 2, with the ring 5 interposed between the clutch sections 3 and 4, so that the lugs 11 engage the openings 12, and the lugs 23 engage the openings 24. The clutch section 4 is mounted on the shaft 2 by loosening the nut 20 and releasing the ring 21 so as to permit expansion of the sleeve 14, and the clutch section 4 may be adjusted axially of the shaft 8 by sliding the sleeve 14 thereon to secure the desired end to end relation of the clutch sections, and the ring 21 may be adjusted circularly around the sleeve 14 to set either shaft forwardly or backwardly with reference to the other shaft so as to time the operation of the mechanisms connected by the coupling, as, for example, in timing a magneto with reference to the crank shaft of an engine for which it furnishes the ignition. After the proper adjustments have been made the nut 20 is screwed down tight thereby clamping the ring 21 on the tapered end of the sleeve 14, and at the same time contracting and clamping the sleeve 14 on the shaft 2. Further adjustment of the coupling may be had at any time by loosening the nut 20.

While I have shown and described my invention in a preferred form, I am aware that various changes and modifications may be made therein without departing from the principles of my invention, and I therefore do not purpose limiting the patent granted hereon otherwise than necessitated by the prior art.

I claim as my invention:

1. The combination with a pair of rotary members of a coupling connecting said members so as to rotate together, said coupling comprising a sleeve adjustable axially on one of said members and a ring adjustable circularly around the sleeve, and means for simultaneously clamping the ring on the sleeve and the sleeve on the said member.

2. The combination with a pair of rotary members of a coupling connecting the said members so as to rotate together and comprising means adjustable axially on one of said members, a connector adjustable circularly on the said means, and means for simultaneously locking the connector and first mentioned means in adjusted positions.

3. In a coupling the combination of a pair of sections loosely connected to rotate together, one of said sections comprising an expansible and contractible clamping member, another member adjustable circularly with reference to the clamping member and movable axially to impart a clamping action to the first mentioned member, and means for simultaneously clamping the first mentioned member and locking the second mentioned member against circular movement.

4. In a coupling adapted to connect a pair of rotary members so as to rotate together, the combination of a split sleeve adapted to engage one of the rotary members and having a tapered portion, a ring rotatable with the other rotary member and adapted to be adjusted circularly around the sleeve and move axially thereon to engage said tapered portion thereof, and a nut adapted to clamp the ring on the said tapered portion and contract the split ring so as to engage the rotary member.

In testimony whereof I have hereunto subscribed my name in the presence of two subscribing witnesses.

CHARLES A. BAILEY.

Witnesses:
 LAWRENCE REIBSTEIN,
 OSCAR HARTMANN.